US012598512B2

(12) United States Patent
Dévai et al.

(10) Patent No.: US 12,598,512 B2
(45) Date of Patent: Apr. 7, 2026

(54) ANOMALY DETECTION IN A WIRELESS COMMUNICATION SYSTEM

(71) Applicant: Telefonaktiebolaget LM Ericsson (publ), Stockholm (SE)

(72) Inventors: Gergely Dévai, Budapest (HU); Attila Báder, Paty (HU); András Zahemszky, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 488 days.

(21) Appl. No.: 18/009,800

(22) PCT Filed: Jun. 24, 2020

(86) PCT No.: PCT/EP2020/067688
§ 371 (c)(1),
(2) Date: Dec. 12, 2022

(87) PCT Pub. No.: WO2021/259467
PCT Pub. Date: Dec. 30, 2021

(65) Prior Publication Data
US 2023/0247485 A1 Aug. 3, 2023

(51) Int. Cl.
*H04W 28/08* (2023.01)
(52) U.S. Cl.
CPC ... *H04W 28/0967* (2020.05); *H04W 28/0942* (2020.05)
(58) Field of Classification Search
CPC .................................................. H04W 28/0967
See application file for complete search history.

(56) References Cited

U.S. PATENT DOCUMENTS

| 2004/0013089 | A1* | 1/2004 | Taneja | ................... | H04L 47/805 |
| | | | | | 370/335 |
| 2013/0073912 | A1* | 3/2013 | Yoshida | ........... | G06Q 10/06395 |
| | | | | | 714/47.1 |
| 2018/0220276 | A1* | 8/2018 | Senarath | ........... | H04M 15/8016 |
| 2019/0215250 | A1* | 7/2019 | Báder | ................. | H04L 41/5019 |
| 2019/0253917 | A1* | 8/2019 | Dao | ................... | H04W 28/0268 |
| 2020/0167258 | A1* | 5/2020 | Chattopadhyay | ..... | G06F 9/5088 |

FOREIGN PATENT DOCUMENTS

WO 2021259529 A1 12/2021

OTHER PUBLICATIONS

International Search Report and Written Opinion of the International Searching Authority, PCT/EP2020/067688, mailed Feb. 10, 2021, 9 pages.

(Continued)

*Primary Examiner* — Jason E Mattis
(74) *Attorney, Agent, or Firm* — Sage Patent Group

(57) ABSTRACT

A node of the wireless communication network receives data indicative of a measured QoS, level of data traffic assigned to different configured traffic forwarding policies each defining one or more target parameters. Based on the data and the target parameters, the node detects violations of the traffic forwarding policies. Based on the detected violations for each the traffic forwarding policies, the node detects at least one anomaly in the wireless communication network.

20 Claims, 11 Drawing Sheets

| Time | 5QI | Cell | Violation ratio |
|------|-----|------|-----------------|
| 08:00-09:00 | 5 | C1 | 0.2 |
| 08:00-09:00 | 6 | C2 | 10 |
| 09:00-10:00 | 5 | C2 | 0.5 |
| 09:00-10:00 | 6 | C2 | 8 |

(56) References Cited

OTHER PUBLICATIONS

Al-Jawad, Ahmed, et al, "Policy-Based QoS Management Framework for Software-Defined Networks", 2008 International Symposium on Networks, Computers, and Communications (ISNCC), IEEE, XP033442735, Jun. 19, 2018, 6 pages.

Din, George, et al, "An Auditing System for QoS-Enabled Networks", Multimedia Signal Processing, 2002 IEEE Workshop on Dec. 9-11, 202, Piscataway, NJ, XP010642366, May 19, 200, 8 pages.

3rd Generation Partnership Project; ETSI TS 123 203 V16.2.0; Digital cellular telecommunications system (Phase 2+) (GSM); Universal Mobile Telecommunications System (UMTS); LTE; Policy and charging control architecture , 3GPP TS 23.203 V16.2.0 Release 16, Nov. 2020, 269 Pages.

3rd Generation Partnership Project; Technical Specification Group Services and System Aspects; System architecture for the 5G System (5GS); 3GPP TS 23.501 V16.4.0, Mar. 2020, 430 pages.

3rd Generation Partnership Project; Technical Specification Group Services and System Aspects; Study of Enablers for Network Automation for 5G (Release 16); 3GPP TS 23.791 16.2.0, Jun. 2019, 124 pages.

* cited by examiner

| Time | 5QI | Cell | Session | Application | Delay (ms) | Error rate |
|---|---|---|---|---|---|---|
| 08:00-08:01 | 5 | C1 | S1 | A1 | 80 | 0.5e-6 |
| 08:00-08:01 | 5 | C2 | S2 | A2 | 120 | 0.7e-6 |
| 08:00-08:01 | 6 | C2 | S3 | A3 | 430 | 0.4e-5 |
| 08:01-08:02 | 5 | C1 | S1 | A1 | 70 | 0.6e-6 |
| 08:01-08:02 | 6 | C2 | S3 | A3 | 280 | 0.4e-5 |

FIG. 5A

| Time | 5QI | Cell | Violation ratio |
|---|---|---|---|
| 08:00-09:00 | 5 | C1 | 0.2 |
| 08:00-09:00 | 6 | C2 | 10 |
| 09:00-10:00 | 5 | C2 | 0.5 |
| 09:00-10:00 | 6 | C2 | 8 |

FIG. 5B

710 — Receive data indicative of QoS level of data traffic assigned to different traffic forwarding policies 720 — Detect violations of traffic forwarding policies 730 — Detect anomaly 740 — Classify anomaly 750 — Reassigning data traffic to traffic forwarding policies 760 — Reconfigure traffic forwarding policy / Configure new traffic forwarding policy

ANOMALY DETECTION IN A WIRELESS COMMUNICATION SYSTEM

CROSS REFERENCE TO RELATED APPLICATIONS

This application is a 35 U.S.C. § 371 national stage application of PCT International Application No. PCT/EP2020/067688 filed on Jun. 24, 2020, the disclosure and content of which is incorporated by reference herein in its entirety.

TECHNICAL FIELD

The present invention relates to methods for controlling transmission of data in a wireless communication network and to corresponding devices, systems, and computer programs.

BACKGROUND

In wireless communication networks, e.g., as specified by 3GPP (3$^{rd}$ Generation Partnership Project), it is known to control user data traffic with the aim of providing a certain QoS (Quality of Service). For example, the 4G (4$^{th}$ Generation) LTE (Long Term Evolution) technology or the 5G (5$^{th}$ Generation) NR (New Radio) technology specified by 3GPP provide a PCC (Policy and Charging Control) architecture which enables control of the user data traffic by enforcing QoS rules. Details concerning the PCC architecture and its functionalities can for example be found in 3GPP TS 23.203 V16.2.0 (2019-12) and 3GPP TS 23.501 V16.4.0 (2020-03).

3GPP TS 23.501 V16.4.0 defines a 5G Quality of Service Indicator (5QI), which is used as a reference to a QoS forwarding behavior. This forwarding behavior is characterized by, e.g., packet error rate, packet delay budget (pdb) and priority. Here, the packet delay budget defined by the 5QIs typically includes delay both in an Access Network (AN) part and in a Core Network (CN) part of the 5G wireless communication network. In addition to standardized 5QI values, network service providers may also define custom 5QIs. In the AN, the forwarding behavior associated with the 5QIs may be implemented by node-specific parameters that determine the packet forwarding behavior, e.g., by scheduling weights, admission thresholds, queue management thresholds, link layer protocol configuration, or the like. In a similar manner, the 4G LTE technology utilizes a Quality Class Indicator (QCI) for indicating a desired QoS forwarding behavior.

Further, in the 5G NR technology, each PDU (Packet Data Unit) session involves one or more QoS Flows. The QoS Flows may be regarded as the finest granularity of QoS differentiation within the PDU session, and each PDU in the same QoS flow is expected to get the same packet forwarding treatment, designated by a 5QI. Similarly, in the 4G LTE technology multiple EPS bearers may be established for QoS differentiation.

For a given 5QI or QCI, the QoS target values apply to regular operation scenarios. This means that it is also possible that these target values are violated, e.g., in a congestion situation where the actual load of one or more network elements is higher than their capacity. In such congestion situations it may thus occur that the system cannot fulfill the requirements of all QoS Flows. A congestion situation may be handled by forwarding packets according to priorities assigned to different traffic types. In particular, higher priority traffic may be prioritized over lower priority traffic, so that the targets defined by the 5QI are met at least for the higher priority traffic.

However, the performance of the existing QoS framework depends on the correct implementation of the desired packet forwarding behavior. In particular, the node-specific parameters determining the packet forwarding behavior need to assure that the target values are kept in non-congestion situations and the priorities are considered in congestion situations.

Incorrect implementation of the desired packet forwarding behavior may endanger Quality of Experience (QoE) perceived by the end users and agreed Service Level Agreements (SLAs). Therefore, detection of such kinds of problems can provide valuable information. Here, for example US 2019/0253917 A1 describes a method for tracking QoS violation events. However, the information provided by such tracking mechanism may still be quite complex and difficult to utilize in resolving problems.

Accordingly, there is a need for techniques which allow for efficiently handling QoS violations that may occur in a wireless communication network.

SUMMARY

According to an embodiment, a method of controlling user data traffic in a wireless communication network is provided. According to the method, a node of the wireless communication network receives data indicative of a measured QoS level of data traffic assigned to different configured traffic forwarding policies each defining one or more target parameters. Based on the data and the target parameters, the node detects violations of the traffic forwarding policies. Based on the detected violations for each the traffic forwarding policies, the node detects at least one anomaly in the wireless communication network.

According to a further embodiment, a node for a wireless communication network is provided. The node is configured to receive data indicative of a measured QoS levels of data traffic assigned to different configured traffic forwarding policies each defining one or more target parameters. Further, the node is configured to detect, based on the data and the target parameters, violations of the traffic forwarding policies. Further, the node is configured to detect, based on the detected violations for each of the traffic forwarding policies, at least one anomaly in the wireless communication network.

According to a further embodiment, a node for a wireless communication network is provided. The node comprises at least one processor and a memory. The memory contains instructions executable by said at least one processor, whereby the node is operative to receive data indicative of a measured QoS levels of data traffic assigned to different configured traffic forwarding policies each defining one or more target parameters. Further, the memory contains instructions executable by said at least one processor, whereby the node is operative to detect, based on the data and the target parameters, violations of the traffic forwarding policies. Further, the memory contains instructions executable by said at least one processor, whereby the node is operative to detect, based on the detected violations for each of the traffic forwarding policies, at least one anomaly in the wireless communication network.

According to a further embodiment of the invention, a computer program or computer program product is provided, e.g., in the form of a non-transitory storage medium, which comprises program code to be executed by at least one processor of a node for a wireless communication network. Execution of the program code causes the node to receive data indicative of a measured QoS levels of data traffic assigned to different configured traffic forwarding policies each defining one or more target parameters. Further, execution of the program code causes the node to detect, based on the data and the target parameters, violations of the traffic forwarding policies. Further, execution of the program code causes the node to detect, based on the detected violations for each of the traffic forwarding policies, at least one anomaly in the wireless communication network.

Details of such embodiments and further embodiments will be apparent from the following detailed description of embodiments.

BRIEF DESCRIPTION OF THE DRAWINGS

FIGS. 5A and 5B illustrates examples of data records as utilized according to an embodiment of the invention.

DETAILED DESCRIPTION OF EMBODIMENTS

Figure 1:
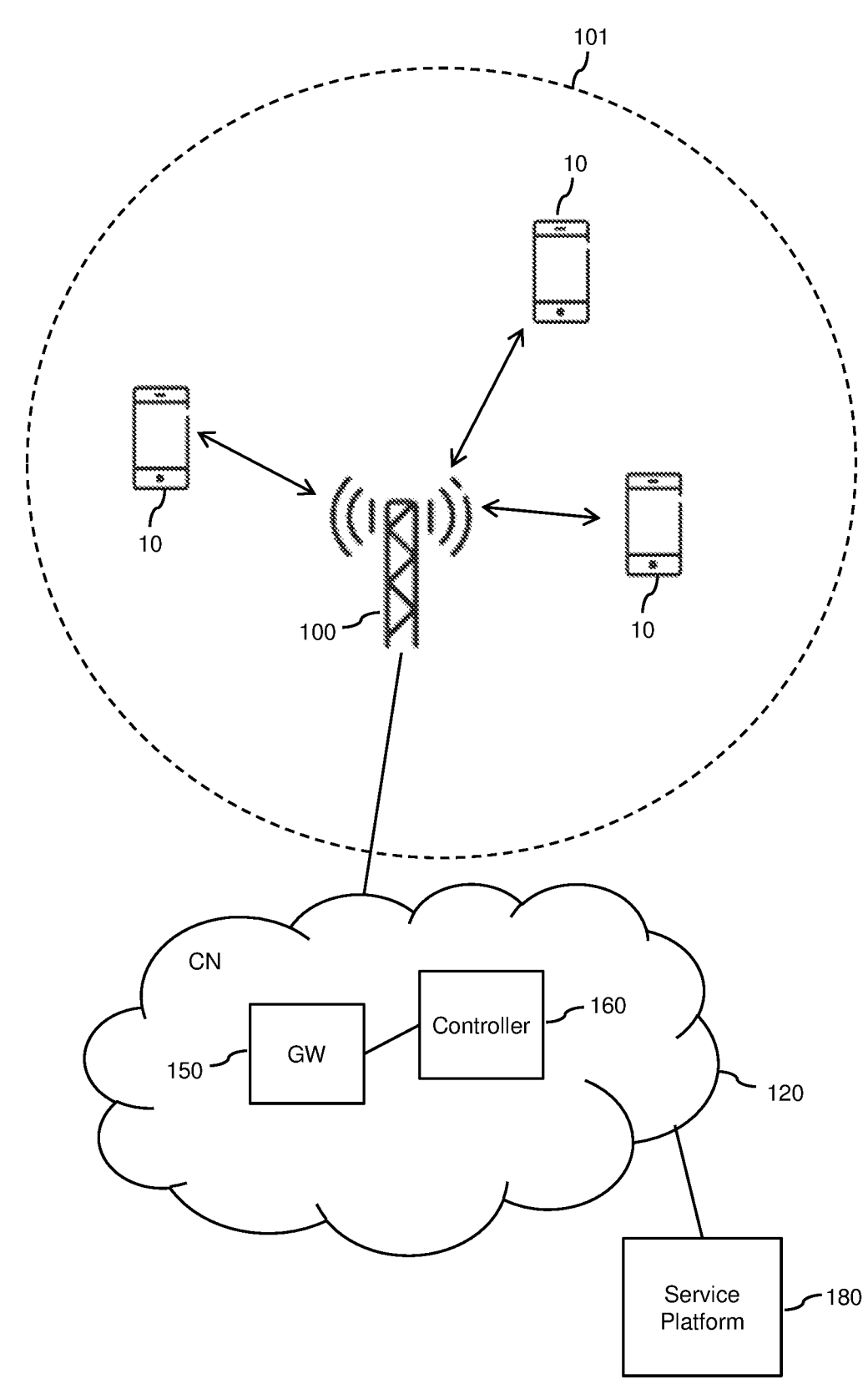
FIG. 1 schematically illustrates an exemplary wireless communication network according to an embodiment of the invention.

In the following, concepts in accordance with exemplary embodiments of the invention will be explained in more detail and with reference to the accompanying drawings. The illustrated embodiments relate to controlling user data traffic in a wireless communication network. The wireless communication network may be based on various technologies. In some of the following, utilization of the 5G NR technology is assumed. Nonetheless it is to be understood the illustrated concepts could also be additionally or alternatively applied in connection with other technologies, e.g., in a wireless communication network based on the LTE radio technology, or a wireless communication network based on a combination of the 5G NR technology and the 4G LTE technology.

The illustrated concepts aim at efficiently detecting and resolving anomalies that may occur in the wireless communication network, in particular anomalies that may adversely affect QoE of end users. Such anomalies may include congestions and/or misconfigurations of forwarding policies. In the illustrated concepts, it is assumed that different traffic forwarding policies are configured for handling data traffic in the wireless communication network. These traffic forwarding policies may each correspond to a different 5QIs. In other words, the 5QIs may be used to identify a traffic forwarding policy to be applied to a certain part of the data traffic, e.g., to one or more QoS flows. For this purpose, an analytics system of the wireless communication network evaluates data indicative of a measured QoS level of the data traffic assigned to the different configured traffic forwarding policies. These data are in the following also referred to as measured QoS data. Each of the traffic forwarding policies also defines one or more target parameters for the QoS, in the following also referred to as QoS targets. The target parameters may in particular include a maximum delay, i.e., a delay value which is not to be exceeded by transmitted data packets. The maximum delay may also be referred to as packet delay budget (pdb). Further, the target parameters may include a maximum packet error rate, i.e., a number of unsuccessfully transmitted data packets in a certain time interval, which is not to be exceeded. The packet error rate may also be referred to as a packet loss rate. Further, each of the data forwarding policies may also be associated with a priority to be applied when handling the data traffic assigned to this data forwarding policy.

Based on the measured QoS data and the QoS targets, the analytics system detects violations of the traffic forwarding policies. Here, a violation is regarded as an event where the measured QoS data indicate that one or more of the QoS targets are not met, e.g., because the measured delay of data packets is above the maximum delay defined as QoS target or the measured packet error rate is above the maximum packet error rate defined as QoS target. The analytics system detects these violations per traffic forwarding policy, i.e., per 5QI. By considering the detected violations for the different traffic forwarding policies, the analytics system may then detect anomalies that occurred in the wireless communication network. This may in particular involve distinguishing between different types of anomaly. For example, the analytics may evaluate the violations as detected for two or more of the traffic forwarding policies to identify presence of an anomaly and to further classify the anomaly as corresponding to a congestion or to a misconfiguration of one or more of the traffic forwarding policies.

FIG. 1 illustrates exemplary structures of the wireless communication network. In particular, FIG. 1 shows multiple UEs 10 in a cell 101 of the wireless communication network. The cell 110 is assumed to be served by an access node 100, e.g., a gNB of the 5G NR technology or an eNB of the 4G LTE technology. The access node 100 may be regarded as being part of the AN part of the wireless communication network, in particular as being part of a RAN (Radio Access Network) of the wireless communication network. Further, FIG. 1 schematically illustrates the CN part 120 of the wireless communication network. In FIG. 1, the CN part 120 is illustrated as including a GW (gateway) 150 and a controller 160. The GW 150 is responsible for handling user data traffic of the UEs 10, e.g., by forwarding user data traffic from a UE 10 to a network destination or by forwarding user data traffic from a network source to a UE 10. Here, the network destination may correspond to another UE 10, to an internal node of the wireless communication network, or to an external node which is connected to the wireless communication network. Similarly, the network source may correspond to another UE 10, to an internal node of the wireless communication network, or to an external node which is connected to the wireless communication network. The controller 160 may in turn be responsible for controlling the user data traffic with respect to QoS, e.g., by providing QoS rules to be enforced by the UEs 10, the GW 150, or other user-plane nodes of the wireless communication network, such as transport nodes in the CN 120 or in the AN.

As illustrated by double-headed arrows, the access node 100 may send DL (downlink) transmissions to the UEs, and the UEs may send UL (uplink) transmissions to the access node 100. The DL transmissions and UL transmissions may be used to provide various kinds of services to the UEs, e.g., a voice service, a multimedia service, or a data service. Such services may be hosted in the CN part 120, e.g., by a corresponding network node. Further, such services may be hosted externally, e.g., by an AF (application function) connected to the CN part 120. By way of example, FIG. 1 illustrates a service platform 180 provided outside the wireless communication network. The service platform 180 could for example connect through the Internet or some other wide area communication network to the CN part 120. The service platform 180 may be based on a server or a cloud computing system and be hosted by one or more host computers. The service platform 180 may include or be associated with one or more AFs that enable interaction of the service platform 180 with the CN part 120. The service platform 180 may provide one or more services to the UEs 10, corresponding to one or more applications. These services or applications may generate the user data traffic conveyed by the DL transmissions and/or the UL transmissions between the access node 100 and the respective UE 10. Accordingly, the service platform 180 may include or correspond to the above-mentioned network destination and/or network source for the user data traffic.

It is noted that the wireless communication network may actually include more access nodes for serving multiple cells in a similar way as explained for the access node 100 and the cell 110. Further, it is noted that in some scenarios the service platform 180 could at least in part also be provided in the CN part 120 and/or in the AN part of the wireless communication network.

Figure 2:
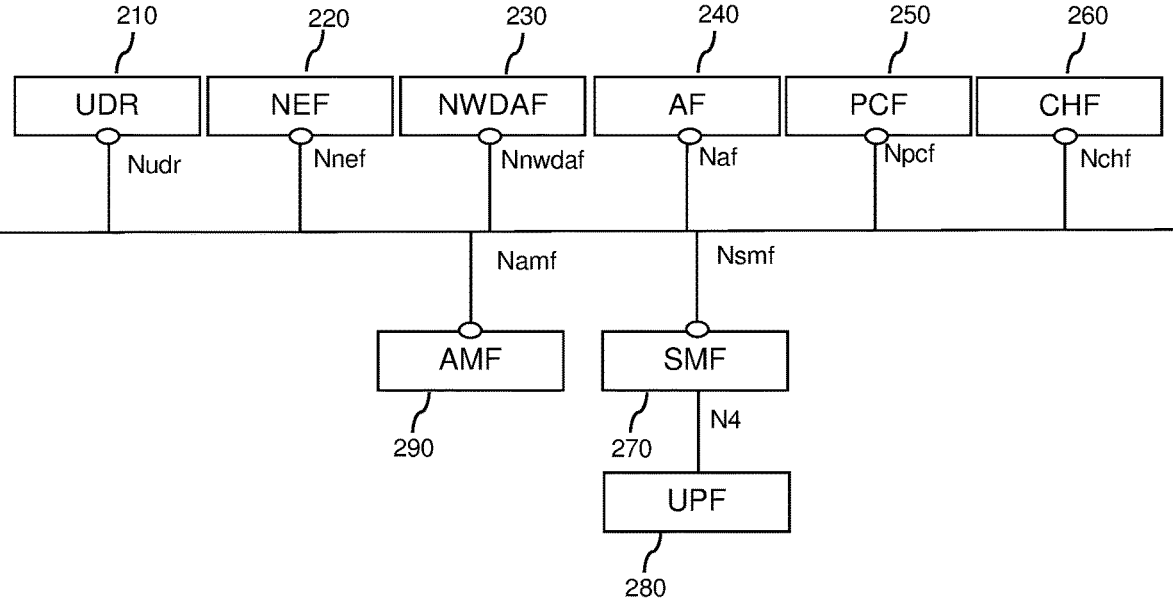
FIG. 2 schematically illustrates an exemplary network architecture as used according to an embodiment of the invention.

As mentioned above, the wireless communication network may be based on the 5G NR technology. FIG. 2 illustrates elements of a 5G CN architecture which a used in connection with the NR technology. Specifically, FIG. 2 illustrates a UDR (Unified Data Repository) 210, an NEF (Network Exposure Function) 220, an NWDAF (Network Data Analytics Function) 230, an AF (Application Function) 240, a PCF (Policy Control Function) 250, a CHF (Charging Function) 260, an SMF (Session Management Function) 270, a UPF (User Plane Function) 280, and an AMF (Access Management Function) 290. Further, FIG. 2 also illustrates interfaces (also referred to as reference points) between these node. Specifically, these interfaces include an Nudr reference point with respect to the UDR 210, an Nnef reference point with respect to the NEF 220, an Nnwdaf reference point with respect to the NWDAF 230, an Naf reference point with respect to the AF 240, an Npcf reference point with respect to the PCF 250, an Nchf reference point with respect to the CHF 260, an Nsmf reference point with respect to the SMF 270, an N4 reference point between the SMF 270 and the UPF 280, and an Namf reference point with respect to the AMF 290.

In the context of the illustrated concepts functionalities of the AF 240 may include interaction with the CN in order to provide one or more services. This may specifically include controlling of traffic handling with respect to QoE, by providing the CN with information on the desired QoE and optionally the actual QoE experienced by the user.

In the context of the illustrated concepts functionalities of the NEF 220 may include exposure of capabilities and events. Specifically, capabilities of network nodes and events may be securely exposed to 3rd party nodes, such as a 3<sup>rd</sup> party AF 240. As further explained below, the functionalities of the NEF 220 may for example be used when establishing a user data session for a certain AF, which requires a certain QoE. Further, the NEF 220 may support secure provision of information from external nodes or applications to the wireless communication network and translate between network-external and network-internal information.

In the context of the illustrated concepts functionalities of the NWDAF 230 may include interaction with various entities for different purposes, such as data collection based on subscription to events provided by the AMF 280, the SMF 270, the PCF 250, UDM (Unified Data Management), the AF 240 (directly or via the NEF 220), and/or an OAM (Operations and Maintenance) system. Further, functionalities of the NWDAF 230 may include retrieval of information from data repositories, e.g., retrieval of subscriber-related information via UDM from the UDR 210. Further, functionalities of the NWDAF 230 may include retrieval of information about NFs (Network Functions), e.g., retrieval of NF-related information from the NRF 215. Further, functionalities of the NWDAF 230 may include on demand provision of analytics to consumers.

In the context of the illustrated concepts functionalities of the PCF 250 may include providing of policy rules to control plane node(s) to enforce them. Specifically, the PCF 250 may support retrieving information on QoS requested for user data traffic from the NEF 220 and installing corresponding PCC rule/s with the corresponding QoS enforcement actions towards the SMF 270.

In the context of the illustrated concepts functionalities of the UPF 280 may include: acting as a point of interconnect to an external data network, e.g., the Internet, packet routing and forwarding, packet inspection, (e.g. application detection based on service data flow template and optionally one or more PFDs (Packet Flow Descriptions) or one or more PDRs (Packet Detection Rules) provided by the SMF 270, user plane policy rule enforcement, e.g., by gating, redirection, traffic steering, and user plane QoS handling, e.g., by rate enforcement or QoS marking.

In the context of the illustrated concepts functionalities of the SMF 270 may include obtaining application-specific PCC rules from the PCF 250. The SMF 270 may also be responsible for providing and activating one or more PDRs (Packet Detection Rules) in the UPF 280 and/or for providing and activating one or more QERs (QoS Enforcement Rules) in the UPF 280. The PDR(s) may be used to identify user data traffic of a certain application and the QER(s) may then be used to indicate the requested QoS handling to the UPF 280.

Further details concerning functionalities of the illustrated nodes and reference points can for example be found in 3GPP TS 23.501 V16.4.0. Further, details on the NWDAF can be found in 3GPP TS 23.288 V16.3.0 (2020-03).

It is noted that while FIG. 2 illustrates typical elements of a 5G CN, not all the illustrated elements are actually required for implementing the illustrated concepts. Further, it is noted that in other implementations, e.g., using a 4G CN architecture, the elements of FIG. 2 could be replaced having other designations, but similar functionalities. For example, in the illustrated concepts the GW 150 of FIG. 1 could be implemented by the UPF 280, and the controller 160 could be implemented by the SMF 270 and/or the PCF 250. In the case of a 4G CN architecture, the GW 150 could be implemented by a PGW (Packet Data Gateway) and the controller 160 could be implemented by a PCRF (Policy and Charging Rules Function).

Figure 3:
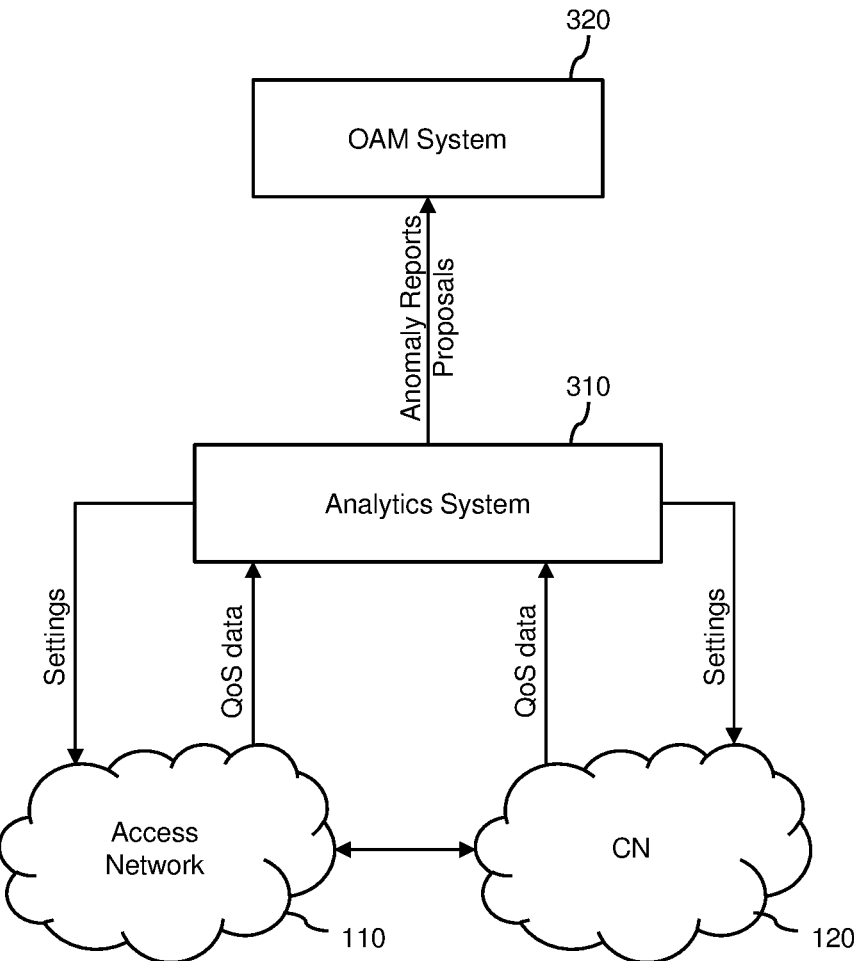
FIG. 3 schematically illustrates an anomaly detection system according to an embodiment of the invention.

FIG. 3 further illustrates an exemplary architecture for implementation of the illustrated concepts. Specifically, FIG. 3 illustrates the AN part 110 of the wireless communication network, the CN part 120 of the wireless communication network, the analytics system 310, and an OAM (Operations and Maintenance) system 320. Although FIG. 3 illustrates the analytics system 310 as a separate element, it is noted that at least a part of the analytics system 310 could be implemented by one or more nodes of the CN part 120, e.g., by the NWDAF 230.

In the illustrated concepts, the AN part 110, in particular the RAN, and CN part 120 may be used as sources for collecting the measured QoS data, e.g., in terms of QOS KPIs (Key Performance Indicators). The analytics system 310 may then correlate, store and process the measured QoS data. As mentioned above, the measured QoS data, such as measured packet error rates and measured packet delays, are analyzed to discover violations of the respective QoS targets associated with the different 5QIs. Further statistical analysis may then be performed to determine the root cause of the anomalies, e.g., misconfiguration by wrong settings of the AN packet forwarding parameters or insufficient resources that lead to congestions at a given location. As a result, anomalies may not only be detected, but also classified. The classified anomalies may then be reported to the OAM system 320, e.g., with the aim of notifying other systems and/or personnel about the problems. In case of misconfigurations, the analytics system 310 may automatically check if the issue can be resolved, e.g., by automatically remapping of data traffic to a different existing traffic forwarding policy or to a new traffic forwarding policy. This may provide a quick solution for the QoS violation problems. In the case of congestions, the collected statistics may in turn be used to generate a prioritized list of network locations where capacity increase is proposed, which may then be provided to the OAM system 320. Accordingly, the results obtained by the evaluations in the analytics system may be communicated to different entities, depending on the type of the result: In case of misconfiguration anomalies, the location in the AN part 110 that is responsible for the problem may be notified. Further, the responsible PCF 250 in the CN part 120 may be instructed to override the existing QoS policy settings in the problematic location. In the case of congestions, a priority list of locations for capacity increase may be sent to the OAM system 320.

Figure 4:
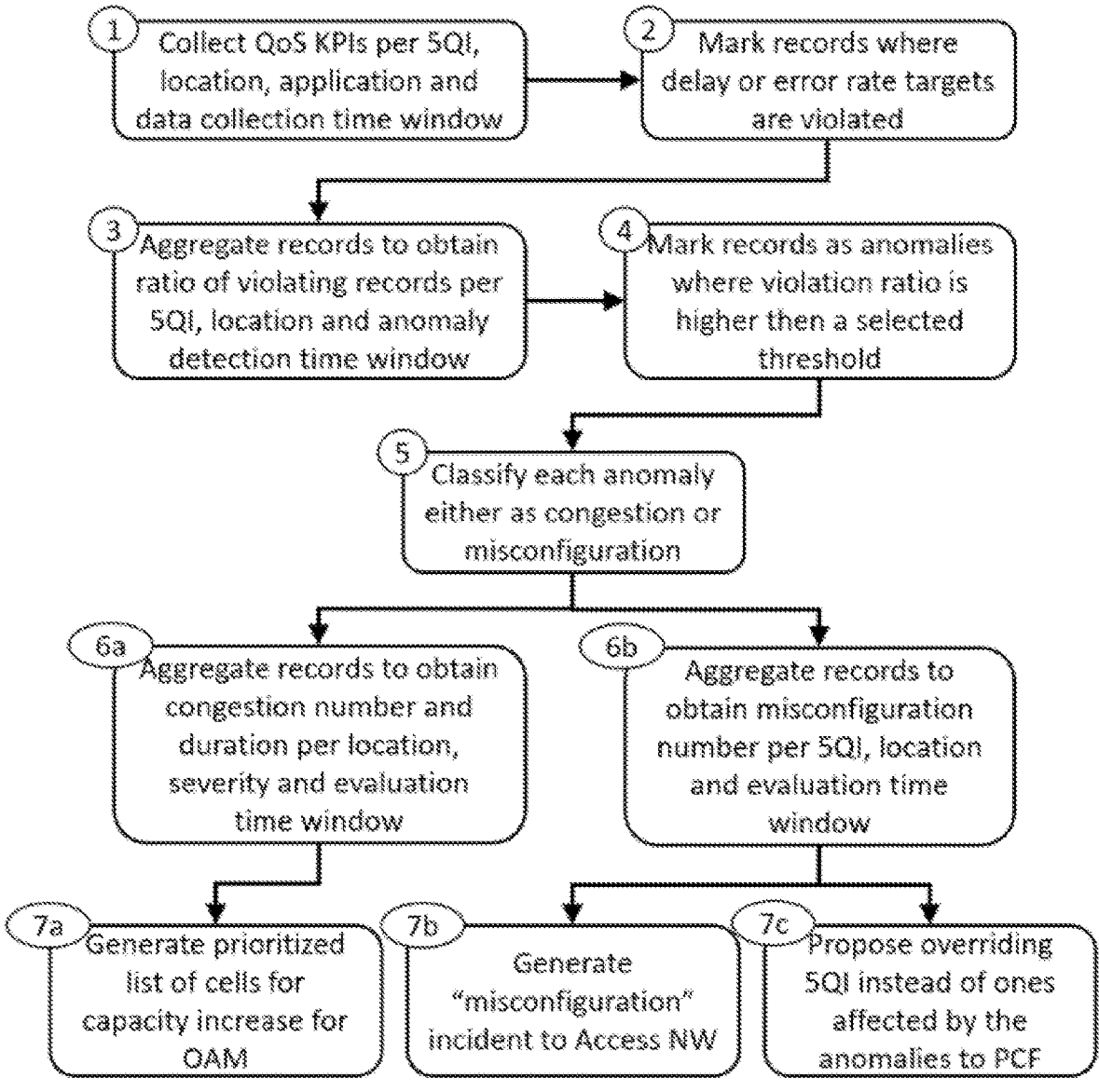
FIG. 4 illustrates an example of processes as utilized according to an embodiment of the invention.

FIG. 4 illustrates an example of processes for implementing the illustrated concepts. The processes of FIG. 4 may for example be implemented by the analytics system 310.

At step (1), measured QoS data in the form of QoS KPIs are collected from the AN part 110 and the CN part 120 of the wireless communication network. These QoS KPIs may for example be collected from user plane nodes, such as from the access nodes 100 or GWs 150 as illustrated in FIG. 1. The analytics system correlates the QoS KPIs by collecting them per associated 5QI, location of measurement, per application or service type, and per data collection time window. In the illustrated example, it is assumed that the measured QoS data include packet error rate and packet delay, separately reported for each QoS flow, each application or service type, each network location, each 5QI, and each data collection time window. The data collection time windows may for example have a length in the range of 1 s to 10 min. FIG. 5A shows a table for illustrating an example of such data records.

At step (2), the collected data records are analyzed and the data records violating the QoS targets defined for the respective 5QI are marked. In the illustrated example, it is assumed that for 5QI=5 the target delay is 100 ms, the target packet error rate is 10–6, and the priority is 10. These values correspond to the definitions of 3GPP TS 23.501 V16.4.0. FIG. 5A illustrates the marked data records by bold outlines.

At step (3), the marked QoS data from step (2) are aggregated over an anomaly detection time window. The anomaly detection time window may for example have a length in the range of 1 min to 10 h. For the aggregated data records, a violation is calculated for each 5QI and each network location. In the illustrated example, the violation ratio is calculated as a ratio of the violating data records, i.e., the data records marked at step (2), with respect to the overall number of the aggregated data records FIG. 5B shows a table for illustrating an example of such aggregated data records resulting from step (3).

At step (4), the aggregated data records with violation ratio higher than a first threshold, e.g., of about 1%, are marked as anomalies. FIG. 5B illustrates the marked aggregated data records by bold outlines.

Figure 6A:
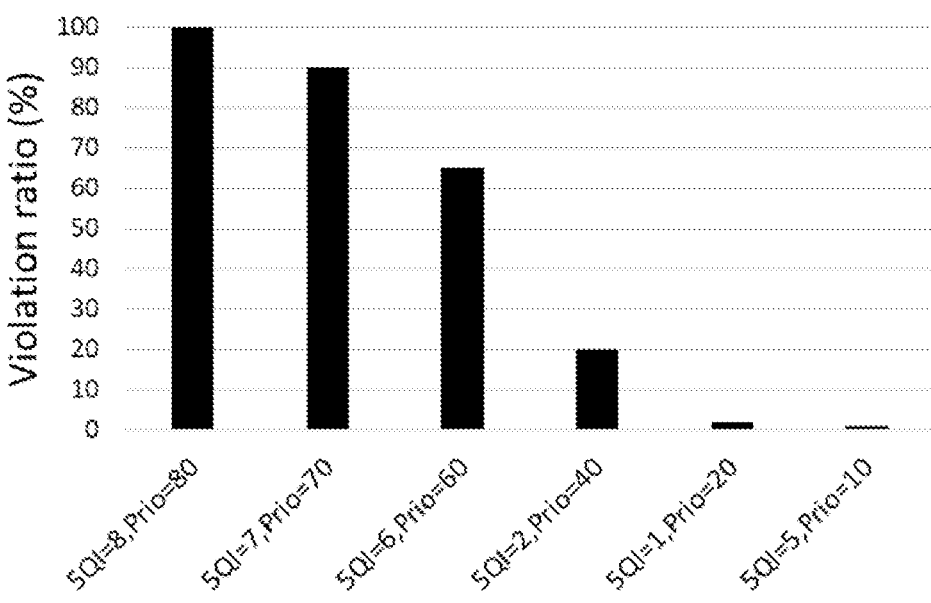
FIGS. 6A-6F illustrate violation ratios as observed in various situations which may occur in a wireless communication network.

At step (5), the anomalies detected at step (4) are classified into the following two categories:

Congestion anomalies: Anomalies corresponding to a congestion are characterized by high violation ratios for 5QIs with low priorities and low violation ratios for 5QIs with high priorities. In the case of a slight congestion, only a few 5QIs have high violation ratios and most of the 5QIs have violation ratios below the first threshold. In case of a severe congestion, most of the 5QIs have high violation ratios and only a few 5QIs with topmost priority, or none of them, have violation ratios below the first threshold. FIG. 6A shows an example of a data set indicating a congestion. As can be seen from the example of FIG. 6A, excessive violation ratios are observed for 5QI=8, 5QI=7, 5QI=6, and 5QI=2. Only for 5QI=1 and 5QI=5, which have higher priorities, the violation ratios are below the first threshold.

Figure 6B:
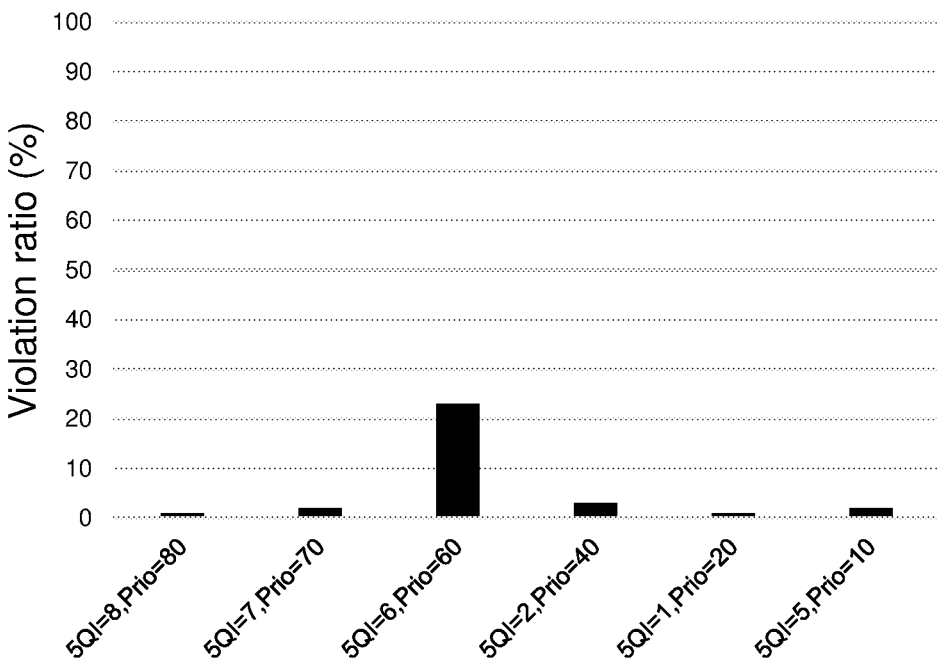

Misconfiguration anomalies: Anomalies corresponding to a misconfiguration are characterized by at least one 5QI with violation ratio higher than a second threshold, e.g., of 5%, and another, lower priority 5QI with violation ratio lower than a third threshold, e.g., of 95%. Such a constellation indicates that the AN part 110 fails to properly implement the traffic forwarding policies associated with the 5QIs and does not properly save resources for higher priority traffic if not all 5QI targets can be met. FIG. 6B shows an example of a data set indicating a misconfiguration. As can be seen from the example of FIG. 6B, a violation ratio above the second threshold is observed for 5QI=6. For all other 5QIs, i.e., 5QI=8, 5QI=7, 5QI=2, 5QI=1, and 5QI=5, the violation ratios are below the third threshold. Because 5QI=6 has a higher priority than 5QI=7 and 5QI=8, this constellation is indicative of a misconfiguration.

It should be noted that in some scenarios it is possible that an anomaly is classified both as a congestion anomaly and a misconfiguration anomaly. This may for example happen if several 5QIs have high violation ratio but the congestion is not handled according to the priority-related requirements. Further details concerning the classification of anomalies as congestion or misconfiguration anomaly are described below.

At steps (6a) and (6b), the anomalies classified at step (5) are aggregated for each network location over an evaluation time window. The length of the aggregation time window may be in the range of 1 day to 10 weeks. The anomalies classified as congestion anomaly are aggregated at step (6a) to obtain a number and average duration of congestions per network location, congestion severity, and evaluation time window. The anomalies classified as misconfiguration anomaly are aggregated at step (6b) to obtain a number of misconfigurations per 5QI, network location, and evaluation time window.

At step (7a), the aggregated congestion anomalies at the different network locations are analyzed to create a priority list of network locations proposed for capacity increase. Further details of step (7a) are described below.

At step (7b), the aggregated misconfiguration anomalies are analyzed to notify the relevant location in the AN part 110 about the underlying problem. Further details of this root cause analysis carried out at step (7b) are described below.

At step (7c) replacement options for the problematic 5QIs may be investigated so that the PCF or other CN nodes may be automatically instructed to apply these replacement 5QIs at the network locations where the misconfiguration anomalies have been detected. Further details of how the replacement 5QIs are determined are described below. Here, it is to be noted that determination of a replacement 5QI involves determination of a suitable traffic forwarding policy which is 35 identified by the replacement 5QI. Accordingly, the functionalities of step (7c) may also be regarded as determination of one or more replacement traffic forwarding policies.

In the following, examples of criteria for classifying an anomalies as a misconfiguration anomaly or as a congestion anomaly will be described in more detail. These criteria may for example be applied at step (5) of the processes of FIG. 4. These examples assume a pair of 5QIs, denoted by 5QI-1 and 5QI-2. This pair of 5QIs may be a subset of a larger set of configured 5QIs. The priority level of 5QI-1 is represented by a priority value P1, and the violation ratio observed for 5QI-1 is denoted by R1. Similarly, the priority level of 5QI-2 is represented by a priority value P2, and the violation ratio observed for 5QI-2 is denoted by R2. It is assumed that a lower value of P1, P2 indicates a higher priority level.

In a first example of classifying a misconfiguration anomaly, 5Q-1 and 5QI-2 have different priority levels and the priority level of 5QI-1 is higher than the priority level of 5QI-2, i.e., P1<P2. If in this case additionally the violation ratio R1 is above a lower bound threshold, e.g., corresponding to the above-mentioned second threshold, and the violation ratio R2 is below an upper bound threshold, e.g., corresponding to the above-mentioned third threshold, the anomaly may be classified as a misconfiguration anomaly. As mentioned above, the lower bound threshold may for example be 5% and the upper bound threshold may for example be 95%. The upper bound threshold is typically higher than the lower bound threshold. The criteria of the first example are for example met in the example shown in FIG. 6B, where 5QI=6 meets these criteria with respect to the lower priority 5QI=7 and 5QI=8.

Figure 6C:
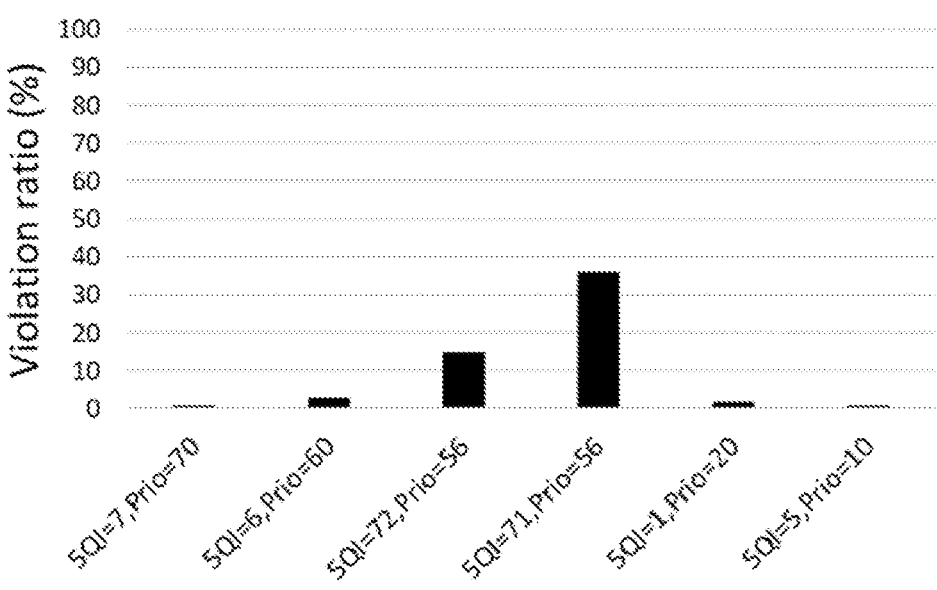

In a second example of classifying a misconfiguration anomaly, the criteria may consider the case that 5QI-1 and 5QI-2 have the same priority level, i.e., P1=P2. If in this case additionally one of the violation ratios R1, R2 is significantly higher than the other, e.g., with R1>2*R2 or R2>2*R1, the anomaly may be classified as a misconfiguration anomaly. For example, this criterion could require that, classify the case as misconfiguration anomaly. The criteria of the second example are for example met in the example shown in FIG. 6C, where 5QI=72 and 5QI=71 have the same priority level (of 56) and the violation ratio of 5QI=71 is more than twice as high as the violation ratio of 5QI=72.

An example of criteria for classifying an anomaly as a congestion anomaly at may involve that the used 5QIs are be divided into two disjoint sets S1 and S2, such that S2 is non-empty and all 5QIs in S1 have higher priority than any 5QI in S2. If then at least a specified percentage, e.g. 80%, of the 5QIs in S2 have a violation ratio higher than a first congestion threshold, e.g., of 5%, and at least a specified percentage, e.g., 80%, of 5QIs in S1 have violation ratio lower than a second congestion threshold, e.g., of 5%, the anomaly may be classified as a congestion. The severity of the detected congestion may be identified on the basis of the priority value of the highest priority 5QI in S2. Here, it is noted that in some scenarios these criteria could also be modified by letting S1 be empty and only considering the first congestion threshold. The criteria of the second example are for example met in the example shown in FIG. 6A, where the 5QIs with priority value 40 or higher, corresponding to low priorities form S2, and the 5QIs with priority values 10 or 20 form S1.

In the following, an example of a process for generating a prioritized list of network locations proposed for capacity increase will be described in more detail. These criteria may for example be applied at step (7a) of the processes of FIG. 4. As a start, the list may be empty and then filled with network locations with at least one detected congestion anomalies. Alternatively, the list could include all network locations or a set of manually configured network locations. For each network location in the list, a priority score is calculated on the basis of the detected congestion anomalies. The higher the priority score, the more urgent is the capacity increase at this network location. The priority score may be calculated based on the aggregated congestion anomalies in the given evaluation time window, e.g., of a few days to a few weeks. In particular, the priority score may be calculated according to:

$$score_{loc} = \sum_{\substack{t \in time\ windows \\ q \in 5QIs}} weight_q \cdot length_t \cdot ratio_{loc,t,q}$$

where:

time windows is the set of anomaly detection time windows within the considered evaluation time window, 5QIs is the set of 5QIs used in the network, $weight_q$ is a weight associated to 5QI q and is defined by the operator and reflects how much business cost is associated to quality problems for applications assigned to a given 5QI, $length_t$ is the length of anomaly detection time window t, $ratio_{loc,t,q}$ is violation ratio of 5QI q in time window t and location loc.

Note that this is an example realization, other aspects such as load, number of impacted affected subscribers and their subscriber groups (e.g. gold, silver etc.) can be considered.

Figure 6D:
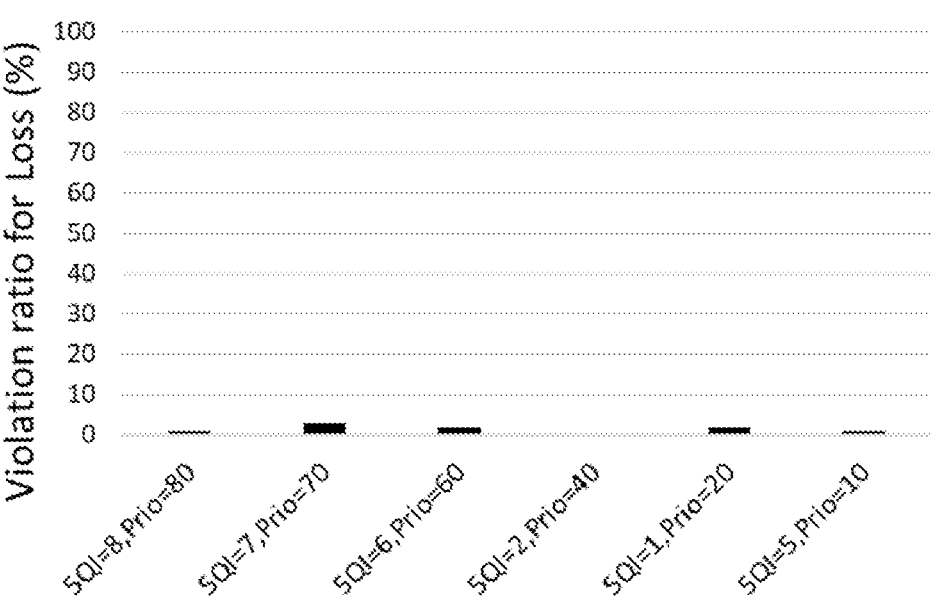
Figure 6E:
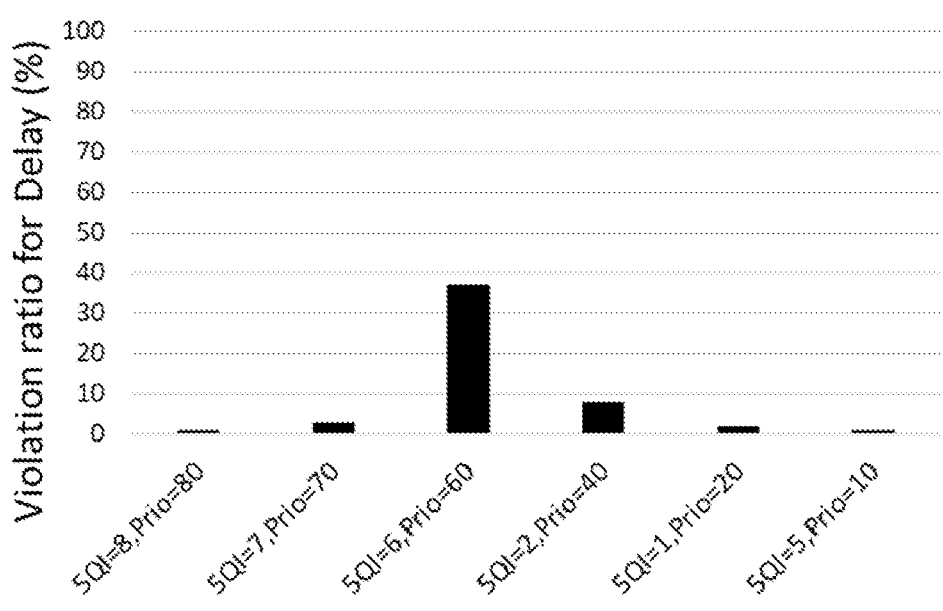

In some scenarios, also a more detailed analysis can be performed, e.g., with the aim of more exactly identifying a source of the detected misconfiguration anomalies. This can be achieved by separating the detection of anomalies according to different QoS parameters, e.g., packet error rate and packet delay. For example, it can occur that an anomaly is detected on the basis of a violation of the target packet error rate in certain data records, but the target packet delay is met in these data records. Similarly, it can occur that an anomaly is detected on the basis of a violation of the target packet delay in certain data records, but the target packet error rate is met in these data records. Still further, for some data records both the target packet delay and the target packet error rate may be violated. This may be utilized in the evaluations by calculation a violation ratio considering only the violations of the target packet delay, i.e., a delay violation ratio $R_D$, and a violation ratio considering only the violations of the target packet error rate, i.e., a loss violation ratio $R_L$. In the case of misconfiguration anomalies, this may help to identify the root cause of the misconfiguration and to derive a proposal for resolving the misconfiguration. FIGS. 6D and 6E show examples of such data observed in the case of a misconfiguration anomaly, with FIG. 6D showing the loss violation ratios observed for the different 5QIs and FIG. 6E showing the delay violation ratios observed for the different 5QIs. If for a given 5QI $R_D$>>$R_L$ (e.g., $R_D$>2*$R_L$), the anomaly may be classified as a misconfiguration anomaly due to one or more delay parameters associated with this 5QI. If for a given 5QI $R_L$>>$R_D$ (e.g., $R_L$>2*$R_D$), the anomaly may be classified as a misconfiguration anomaly due to one or more loss parameters associated with this 5QI.

Figure 6F:
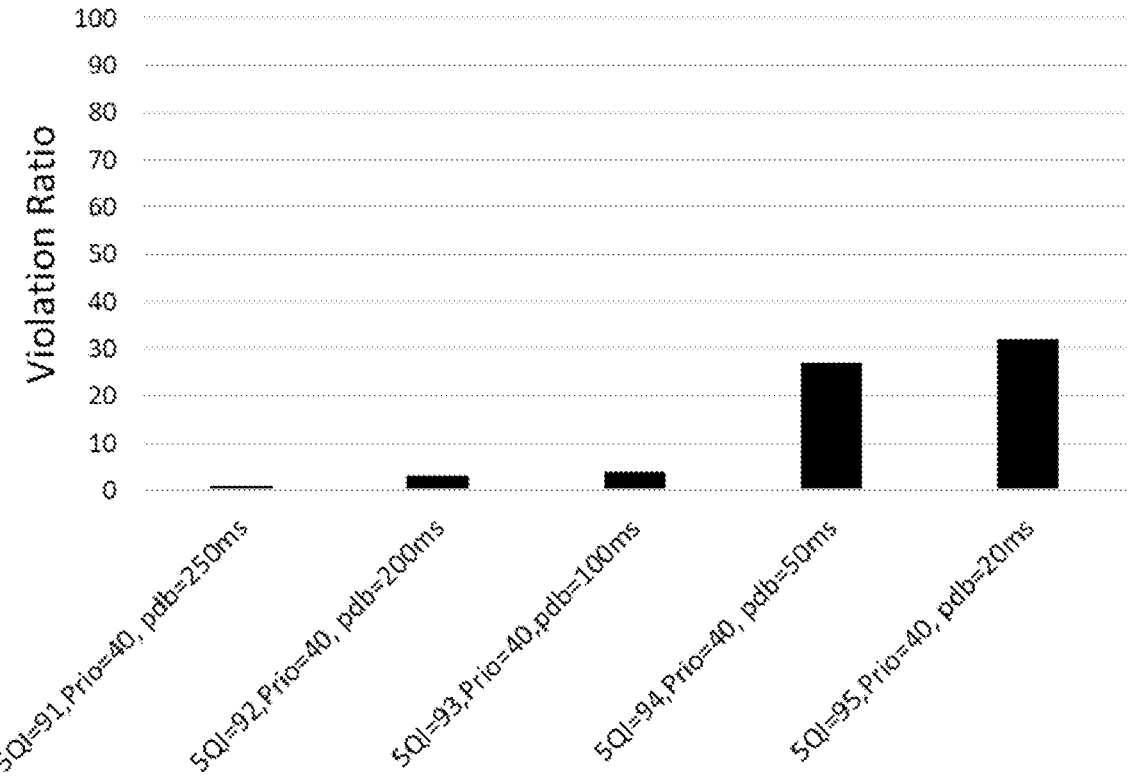

In the above some of the above criteria, the 5QIs may also be aggregated to 5QI groups having the same priority level, and the violation ratios may be calculated per priority level. However, in some scenarios additional information may be obtained by calculating the violation ratios per individual 5QI. This may for example be useful when multiple 5QIs are associated with the same priority level. FIG. 6F illustrates a corresponding example. For example, in some scenarios, it could be identified that the detected misconfiguration anomaly is due to the 5QIs associated with a low target packet delay. This may for example indicate a problem of misconfiguration of lower radio layers or of the radio scheduler for these specific 5QIs. In another, it could be identified that the misconfiguration anomaly is due to 5QIs with packet loss ratio below a given threshold. This may also hint at lower radio layers being configured incorrectly.

In the following, examples of automated processes determination of replacement 5QIs in the case of misconfiguration anomalies will be described in more detail. These processes may for example be applied at step (7c) of the processes of FIG. 4. The determination of replacement 5QIs may provide a quick and at least temporary solution to resolve quality issues. These measures may in some cases be complemented by other manual or automated processes which allow for a more refined analysis and fixing of the quality issues in a more sustainable manner, e.g., by replacement of hardware or reconfiguration of settings beyond the traffic forwarding policies.

When a misconfiguration anomaly is detected for a 5QI of a given priority level, a first step is to check if there is a similar misconfiguration anomaly in one or more other 5QIs of the same or higher priority level. If no anomaly is seen in at least some of the 5QIs of higher priority levels, this is an indication that at least a part of the issues causing the misconfiguration anomaly can be resolved by reassigning at least a part of the data traffic to one or more replacement 5QIs. The replacement 5QIs may correspond to 5QIs which are already used in the wireless communication network. In addition or as an alternative, one or more replacement 5QIs could be newly configured. Here, it is to be noted that configuration of a replacement 5QI may involve defining a traffic forwarding policy, e.g., in terms of QoS rules, QoS parameters, QoS targets, and priority level. The reassignment of the data traffic may in some cases be limited to a certain areas, certain cells, or certain subscriber groups, for which the misconfiguration anomaly was detected. The reassignment may involve that the data traffic is mapped to a replacement 5QI with a higher priority level, but with the same or similar QoS targets, in particular the same target packet delay and the same target packet error rate as the original 5QI to be replaced. If no such replacement 5QI is available among the existing 5QIs, the data traffic is mapped to a replacement 5QI with the same or higher priority level, but which has more strict QoS targets, e.g., lower target packet delay and/or lower target packet error rate than the original 5QI to be replaced. In these processes 5QIs for which an anomaly was detected may be excluded from being used as a replacement 5QI.

According to 3GPP TS 23.501 V16.4.0, it is also possible to dynamically define new 5QIs and associated traffic forwarding policies. Accordingly, the replacement 5QI could also be newly defined, e.g., keeping the QoS targets of the original 5QI to be replaced, while increasing the priority level, preferably to the next higher priority level where no anomaly was detected.

Figure 7:
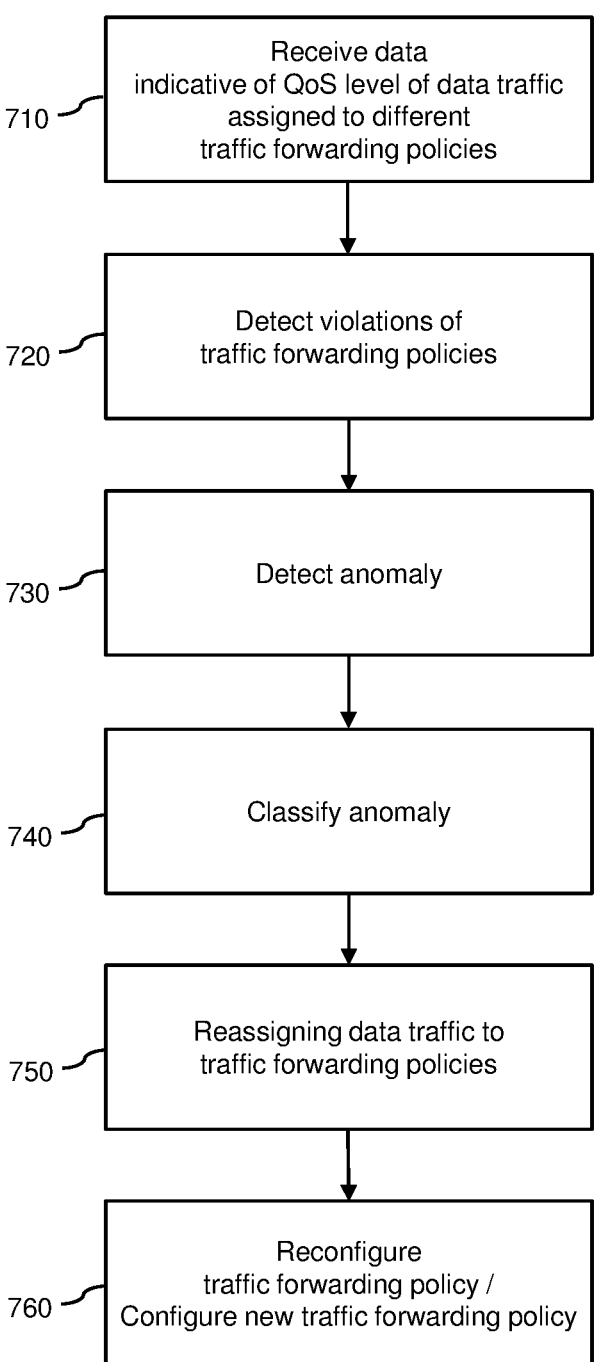
FIG. 7 shows a flowchart for illustrating a method according to an embodiment of the invention.

FIG. 7 shows a flowchart for illustrating a method of controlling user data traffic in a wireless communication network. The method of FIG. 7 may be utilized for implementing the illustrated concepts in a node of the wireless communication network. The node may implement an analytics system or at least a part of functionalities of an analytics system, such as the above-mentioned analytics system 310. In some scenarios, the node may correspond to an NWDAF of the wireless communication system.

If a processor-based implementation of the node is used, at least some of the steps of the method of FIG. 7 may be performed and/or controlled by one or more processors of the node. Such node may also include a memory storing program code for implementing at least some of the below described functionalities or steps of the method of FIG. 7.

At step 710, the node receives data indicative of a measured QoS level of data traffic assigned to different configured traffic forwarding policies. The traffic forwarding policies each define one or more target parameters. When utilizing the 5G NR technology, the traffic forwarding policies may be identified by 5QIs. When utilizing the 4G LTE technology, the traffic forwarding policies may be identified by QCIs. The target parameters may correspond to the above-mentioned QoS targets and may in particular include at least one of a target packet delay and a target packet error rate.

The node may receive the data from one or more further nodes of the wireless communication network. The one or more further nodes may include one or more nodes of an AN part of the wireless communication network, such as the above-mentioned access node 100. Further, the one or more further nodes may include one or more nodes of a CN part of the wireless communication network, such as the above-mentioned gateway 150 or controller 160. In some scenarios, the one or more further nodes may include a UPF and/or a PCF. In some scenarios, the one or more further nodes may include a PGW and/or a PCRF.

At step 720, the node detects violations of the traffic forwarding policies. This is accomplished based on the data received at step 710 and the target parameters defined by the traffic forwarding policies.

At step 730, the node detects at least one anomaly in the wireless communication network. This is accomplished based on the violations detected at step 720. Here, in particular the violations detected for each the traffic forwarding policies are considered. Accordingly, the detection of the anomaly is based on violations as detected for multiple traffic forwarding policies.

In some scenarios, if the target parameters include a target delay defined for each of the traffic forwarding policies, detecting the at least one anomaly may involve detecting a first type of anomalies based on violations of only the target delays. In some scenarios, if the target parameters include a target packet error rate defined for each of the traffic forwarding policies, detecting the at least one anomaly may involve detecting a second type of anomalies based on violations of only the target packet error rates. Corresponding examples of separating the detection of anomalies according to different QoS parameters were explained in connection with FIGS. 6D and 6E.

At step 740, the node may classify the at least one anomaly detected at step 730. In particular, the node classifies the anomaly as corresponding to at least one of a congestion in the wireless communication network and a misconfiguration of one or more of the traffic forwarding policies. This is accomplished based on the detected violations for each of the traffic forwarding policies.

In some scenarios, the data comprise a number of data records and the process of classifying the detected at least one anomaly may then further involve that, or each the traffic forwarding policies, the node determines a ratio of data records corresponding to the detected violations to the number of data records, such as the above-mentioned violation ratios. Based on the ratios, the node may then classify the detected at least one anomaly as corresponding to at least one of a congestion in the wireless communication network and a misconfiguration of one or more of the traffic forwarding policies. In particular, the node may compare the ratios to at least one threshold. Based on the comparison, the node may then classify the detected at least one anomaly as corresponding to at least one of a congestion in the wireless communication network and a misconfiguration of the traffic forwarding policy.

In some scenarios classifying the anomaly may involve that, in response to the ratio being above a first threshold for a first subset of two or more of the traffic forwarding policies, the node classifies the anomaly as corresponding to a congestion.

In some scenarios classifying the anomaly may involve that, in response to the ratio being above the first threshold for the first subset of the traffic forwarding policies and the ratio being below a second threshold for a second subset of one or more of the traffic forwarding policies, with the one or more traffic forwarding policies of the second subset being associated with a higher traffic priority than the traffic forwarding policies of the first subset, the node classifies the at least one anomaly as corresponding to a congestion.

In some scenarios classifying the anomaly may involve that, in response to the ratio being above a third threshold for a third subset of one or more of the traffic forwarding policies and the ratio being below a fourth threshold for a fourth subset of one or more of the traffic forwarding policies, with the or more traffic forwarding policies of the fourth subset being associated with a higher traffic priority than the one or more traffic forwarding policies of the third subset, the node classifies the anomaly as corresponding to a misconfiguration of one or more of the traffic forwarding policies of the third subset.

At step 740, the node may reassign at least a part of the data traffic to one or more traffic forwarding policies associated with a higher priority. This may be accomplished in response to classifying the anomaly a misconfiguration. The one or more traffic forwarding policies associated with a higher priority may include one or more existing traffic forwarding policies already configured in the wireless communication network and/or one more traffic forwarding policies newly configured in response to detecting and classifying the anomaly, such as explained above for the replacement 5QIs.

As illustrated by step 750, the node may use the detected at least one anomaly as a basis for reconfiguring at least some of the traffic forwarding policies and/or configuring at least one new traffic forwarding policy. Here the process of reconfiguring or configuring the traffic forwarding policy can involve modifying forwarding rules or parameters defined by the traffic forwarding rule and/or modifying assignment of data traffic to the traffic forwarding policies In some scenarios, based on the above-mentioned ratios for each of the traffic forwarding policies, the node may determine a number of violations per network location and per traffic forwarding policy. Alternatively or in addition, based on the detected at least one anomaly, the node determine a rate of anomalies per network location. Based on the rate of anomalies and/or the number of violations, the node may then determine a score for prioritizing among capacity increase measures at different network locations, such as the above-mentioned priority score.

Figure 8:
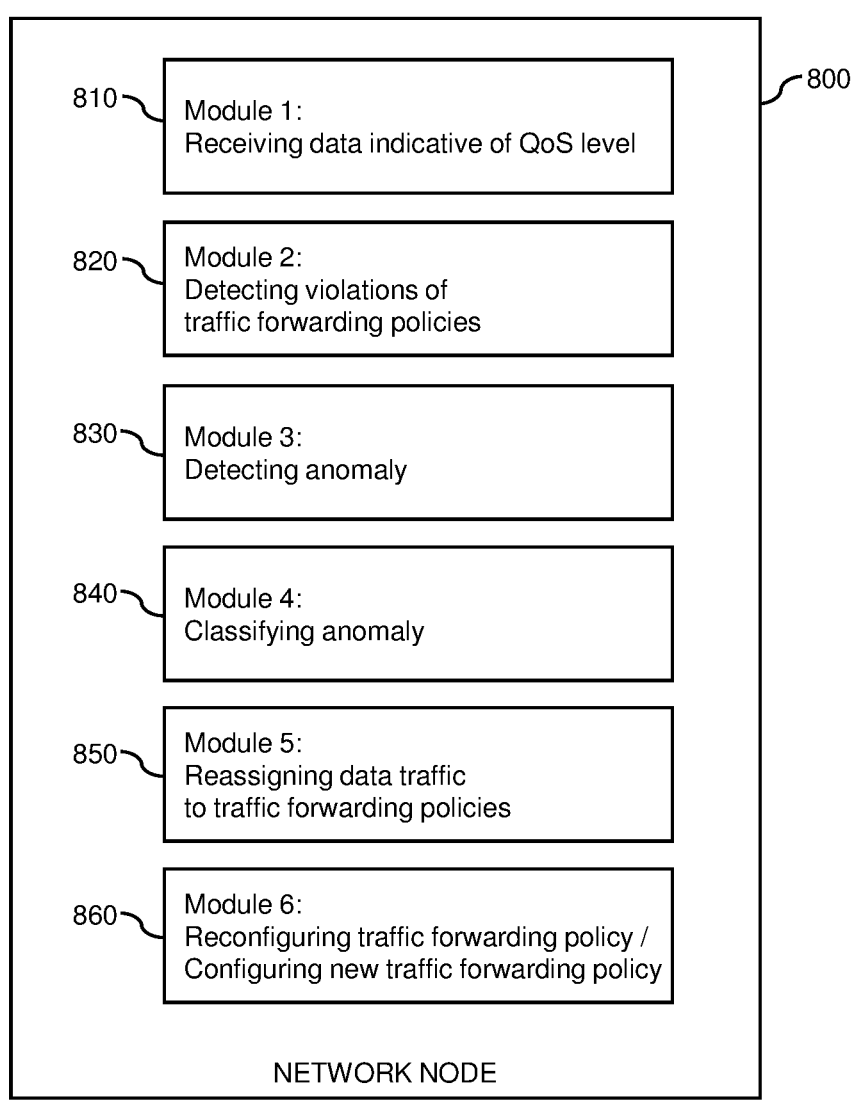
FIG. 8 shows an exemplary block diagram for illustrating functionalities of a network node implementing functionalities corresponding to the method of FIG. 7.

FIG. 8 shows a block diagram for illustrating functionalities of a network node 800 which operates according to the method of FIG. 7. The network node 800 may for example implement an analytics system or at least a part of functionalities of an analytics system, such as the above-mentioned analytics system 310. In some scenarios, the node may correspond to an NWDAF of the wireless communication system. As illustrated, the network node 800 may be provided with a module 810 configured to receive data indicative of measured QoS level, such as explained in connection with step 710. Further, the network node 800 may be provided with a module 820 configured to detect violations of traffic forwarding policies, such as explained in connection with step 720. Further, the network node 800 may be provided with a module 830 configured to detect at least one anomaly, such as explained in connection with step 730. Further, the network node 800 may optionally be provided with a module 840 configured to classify the at least one anomaly, such as explained in connection with step 740. Further, the network node 800 may optionally be provided with a module 850 configured to reassign data traffic to traffic forwarding policies, such as explained in connection with step 750. Further, the network node 800 may optionally be provided with a module 860 configured to reconfigure or newly configure traffic forwarding policies, such as explained in connection with step 760.

It is noted that the network node 800 may include further modules for implementing other functionalities, such as known functionalities of an analytics system or of a NWDAF. Further, it is noted that the modules of the network node 800 do not necessarily represent a hardware structure of the network node 800, but may also correspond to functional elements, e.g., implemented by hardware, software, or a combination thereof.

Figure 9:
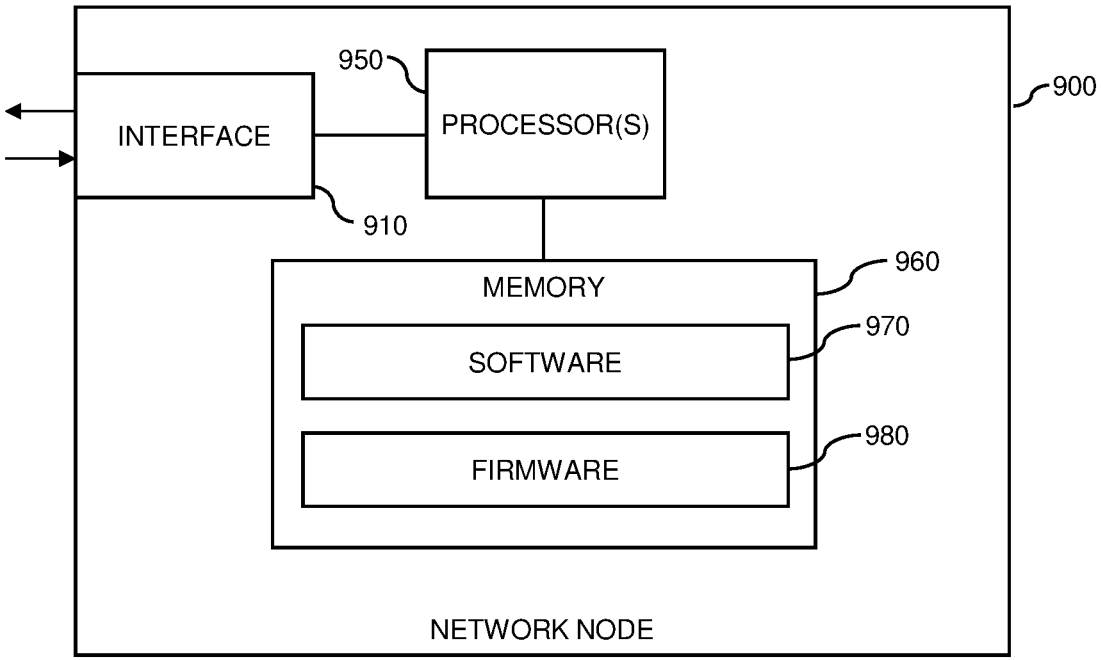
FIG. 9 schematically illustrates structures of a node according to an embodiment of the invention.

FIG. 9 illustrates a processor-based implementation of a network node 900 which may be used for implementing the above-described concepts. For example, the structures as illustrated in FIG. 9 may be used for implementing any of the analytics system implementing the illustrated concepts, like the analytics system 310, an NWDAF implementing the illustrated concepts, like the NWDAF 230. In some scenarios, also a system of multiple network nodes 900 with structures as illustrated in FIG. 9 may be used implementing the above-described concepts.

As illustrated, the network node 900 includes one or more interfaces 910. These interfaces 910 may for example be used for enabling communication with one or more other nodes. The interfaces 910 may for example be used for implementing one or more of the reference points shown in FIG. 2.

Further, the network node 900 may include one or more processors 950 coupled to the interface(s) 910 and a memory 960 coupled to the processor(s) 950. By way of example, the interface(s) 910, the processor(s) 950, and the memory 960 could be coupled by one or more internal bus systems of the network node 900. The memory 960 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 960 may include software 970 and/or firmware 980. The memory 960 may include suitably configured program code to be executed by the processor(s) 950 so as to implement the above-described functionalities of a network node, such as explained in connection with FIGS. 7 and 8.

It is to be understood that the structures as illustrated in FIG. 9 are merely schematic and that the network node 900 may actually include further components which, for the sake of clarity, have not been illustrated, e.g., further interfaces or processors. Also, it is to be understood that the memory 960 may include further program code for implementing known functionalities of a network node, e.g., known functionalities of an NWDAF of a 3GPP network. According to some embodiments, also a computer program may be provided for implementing functionalities of the network node 900, e.g., in the form of a physical medium storing the program code and/or other data to be stored in the memory 960 or by making the program code available for download or by streaming.

As can be seen, the concepts as described above may be used for providing a data-driven solution to monitor the efficiency of the realization of a QoS framework configured in a wireless communication network. The concepts may enable the automated discovery of problems and their classification. This may provide various benefits, because anomalies falling into different categories typically require different actions from the network operator for resolving underlying issues. Therefore, the illustrated concepts may contribute to better quality of the network, because they help to discover problems that otherwise could remain hidden. Further, the illustrated concepts may help to shorten the time needed to resolve problems causing the anomalies. Further, the illustrated concepts may help to achieve a better QoE perceived by the end users and/or to better fulfill of SLAs. Further, the illustrated concepts may help to save costs for the network operator by automating troubleshooting procedures as well as providing data-driven proposals on network capacity increase.

It is to be understood that the examples and embodiments as explained above are merely illustrative and susceptible to various modifications. For example, the illustrated concepts may be applied in connection with various wireless communication network technologies, without limitation to the NR technology.

Moreover, it is to be understood that the above concepts may be implemented by using correspondingly designed software to be executed by one or more processors of an existing device or apparatus, or by using dedicated device hardware. Further, it should be noted that the illustrated nodes may each be implemented as a single device or as a system of multiple interacting devices or modules, e.g., as a cloud system.

The invention claimed is:

1. A method of controlling user data traffic in a wireless communication network, the method comprising:

a node of the wireless communication network receiving data indicative of a measured Quality of Service (QOS) level of data traffic assigned to different configured traffic forwarding policies each defining one or more target parameters;

based on the data and the target parameters, the node detecting violations of the traffic forwarding policies; and based on the detected violations for each of the traffic forwarding policies, the node detecting at least one anomaly in the wireless communication network, wherein detecting the at least one anomaly includes, for each traffic forwarding policy, determining a ratio of data records corresponding to the detected violations to a total number of data records for that traffic forwarding policy.

2. The method according to claim 1, comprising:

based on the detected violations for each of the traffic forwarding policies, the node classifying the detected at least one anomaly as corresponding to at least one of a congestion in the wireless communication network and a misconfiguration of one or more of the traffic forwarding policies.

3. The method according to claim 2, comprising:

wherein the data comprise a number of data records and said classifying of the detected at least one anomaly comprises:

based on the ratios, classifying the detected at least one anomaly as corresponding to at least one of a congestion in the wireless communication network and a misconfiguration of one or more of the traffic forwarding policies.

4. The method according to claim 3, wherein said classifying of the detected at least one anomaly comprises:

comparing the ratios to at least one threshold, and based on the comparison, classifying the detected at least one anomaly as corresponding to at least one of a congestion in the wireless communication network and a misconfiguration of the traffic forwarding policy.

5. The method according to claim 4, comprising:

in response to the ratio being above a first threshold for a first subset of two or more of the traffic forwarding policies, classifying the anomaly as corresponding to a congestion.

6. The method according to claim 5, in response to the ratio being above the first threshold for the first subset of the traffic forwarding policies and the ratio being below a second threshold for a second subset of one or more of the traffic forwarding policies, with the one or more traffic forwarding policies of the second subset being associated with a higher traffic priority than the traffic forwarding policies of the first subset, classifying the at least one anomaly as corresponding to a congestion.

7. The method according to claim 4, in response to the ratio being above a third threshold for a third subset of one or more of the traffic forwarding policies and the ratio being below a fourth threshold for a fourth subset of one or more of the traffic forwarding policies, with the one or more traffic forwarding policies of the fourth subset being associated with a higher traffic priority than the one or more traffic forwarding policies of the third subset, classifying the anomaly as corresponding to a misconfiguration of one or more of the traffic forwarding policies of the third subset.

8. The method according to claim 3, comprising:

in response to classifying the anomaly as corresponding to a misconfiguration, reassigning at least a part of the data traffic to one or more traffic forwarding policies associated with a higher priority.

9. The method according to claim 3, comprising:

based on the ratios for each of the traffic forwarding policies, the node determining a rate of violations per network location and per traffic forwarding policy.

10. The method according to claim 1, comprising:

based on the detected at least one anomaly, the node determining a number of anomalies per network location.

11. The method according to claim 9, comprising:

based on the rate of violations and/or the number of violations, the node determining a score for prioritizing among capacity increase measures at different network locations.

12. The method according to claim 1, wherein the target parameters comprise a target delay defined for each of the traffic forwarding policies.

13. The method according to claim 12, wherein detecting the at least one anomaly comprises detecting a first type of anomalies based on violations of only the target delays.

14. The method according to claim 1, wherein the target parameters comprise a target packet error rate defined for each of the traffic forwarding policies.

15. The method according to claim 14, wherein detecting the at least one anomaly comprises detecting a second type of anomalies based on violations of only the target packet error rates.

16. The method according to claim 1, based on the detected at least one anomaly, reconfiguring at least some of the traffic forwarding policies.

17. The method according to claim 1, comprising:

based on the detected at least one anomaly, configuring at least one new traffic forwarding policy.

18. The method according to claim 1, comprising:

the node receiving the data from one or more further nodes of the wireless communication network.

19. The method according to claim 18, wherein the one or more further nodes comprise at least one node of an access network part of the wireless communication network.

20. The method according to claim 18, wherein the one or more further nodes comprise at least one node of a core network part of the wireless communication network.

* * * * *